United States Patent
McKnight et al.

(10) Patent No.: US 8,488,243 B2
(45) Date of Patent: Jul. 16, 2013

(54) HEAD-TRACKING ENHANCED STEREO GLASSES

(75) Inventors: Douglas J. McKnight, Boulder, CO (US); Michael G. Robinson, Boulder, CO (US)

(73) Assignee: RealD Inc., Beverly Hills, CA (US)

(*) Notice: Subject to any disclaimer, the term of this patent is extended or adjusted under 35 U.S.C. 154(b) by 413 days.

(21) Appl. No.: 12/606,825

(22) Filed: Oct. 27, 2009

(65) Prior Publication Data

US 2010/0103516 A1    Apr. 29, 2010

Related U.S. Application Data (60) Provisional application No. 61/108,830, filed on Oct. 27, 2008.

(51) Int. Cl.
*G02B 27/10* (2006.01)
(52) U.S. Cl.
USPC ............ 359/618; 359/630; 359/237; 359/465
(58) Field of Classification Search
USPC .................. 359/630, 618, 465, 237; 348/51
See application file for complete search history.

(56) References Cited

U.S. PATENT DOCUMENTS

| | | | |
|---|---|---|---|
| 5,430,505 A | | 7/1995 | Katz |
| 5,712,732 A | * | 1/1998 | Street ............................ 359/630 |
| 5,886,822 A | | 3/1999 | Spitzer |
| 6,163,336 A | | 12/2000 | Richards |
| 6,266,136 B1 | * | 7/2001 | Ramer et al. ............. 356/139.03 |
| 6,304,286 B1 | | 10/2001 | Shirai |
| 6,349,001 B1 | * | 2/2002 | Spitzer .......................... 359/618 |
| 6,552,836 B2 | * | 4/2003 | Miller ............................ 359/237 |
| 6,791,531 B1 | | 9/2004 | Johnston et al. |

OTHER PUBLICATIONS

Notice, International Search Report and Written Opinion of the International Searching Authority in co-pending PCT application No. PCT/US09/62221 dated Feb. 18, 2010.
Lee, J.C., "WiiDesktopVR", http://www.cs.cmu.edu/~johnny/projects/wii/WiiDesktopVR.zip, Managed Library for the Nintendo Wiimote available at www.wiimotelib.net.

\* cited by examiner

*Primary Examiner* — Kyung H Shin
(74) *Attorney, Agent, or Firm* — Baker & McKenzie LLP (57) ABSTRACT

Stereoscopic display systems including a position-tracking system that determine the position of the stereoscopic eyewear worn by a viewer. An exemplary embodiment of the eyewear includes retro-reflective reflectors that are illuminated by an infrared illuminator proximate to or optically co-axial with a capturing camera. Suppression reflections from other reflective features in the vicinity may be achieved by control of the polarization of the infrared light.

36 Claims, 7 Drawing Sheets

POSITION "A"

*FIG. 1A*

POSITION "B"

HEAD-TRACKING ENHANCED STEREO GLASSES

CROSS-REFERENCE TO RELATED APPLICATION

This application relates and claims priority to commonly-assigned U.S. Provisional Patent Application No. 61/108,830, filed Oct. 27, 2008, and entitled "Head tracking enhanced stereo glasses" which is incorporated herein by reference for all purposes.

TECHNICAL FIELD

The present disclosure generally relates to head-tracking devices, systems and methods, and more specifically, to head-tracking devices, systems and methods that enhance interactive three-dimensional (3D) viewing experiences.

BACKGROUND

Stereoscopic, or stereo, 3-D displays enhance the perception of images presented on a 2-D screen by presenting different images to each eye of the viewer. The viewer's visual system fuses these disparate images in such a way as to create a sensation of depth. To create 3-D effects, conventional approaches have used eyewear to determine which image data goes to the left or right eye. One conventional 3-D system is the RealD cinema system that uses passive circularly-polarized glasses to separate time-sequentially projected circularly-polarized images. Another conventional system is the "Xpol" system currently being sold on a Hyundai LC television, which uses circularly-polarized glasses to separate left and right circularly-polarized images, presented in an interlaced fashion on alternating lines of the display. Conventional 3-D systems also include shutter glass systems such as the RealD "CrystalEyes" that use fast liquid crystal shutters built into the eyewear to select alternating right and left images presented by a (typically unpolarized) fast display, such as a DLP, or plasma, display. Conventional 3-D systems further include anaglyph glasses, which use different colored filters for each eye, such as a red filter for the left eye and a cyan filter for the right eye. Stereoscopic image pairs can be processed appropriately into these two color channels, yielding an effect that is not as good as is available with the polarization-based systems listed above, but which has the advantage of working with any color display, including broadcast TV.

SUMMARY

An embodiment disclosed herein is directed to a head-tracking device operable to track head positions of a viewer. The head-tracking device includes a pair of stereoscopic eyewear, which further includes a frame and a pair of lenses disposed within a pair of openings defined through the frame, the pair of lenses operable to receive and transmit stereoscopic images to eyes of the viewer. The head-tracking device also includes a reflector coupled to the pair of stereoscopic eyewear, the reflector being operable to reflect incident light along different reflected paths as the head of the viewer moves.

Another embodiment disclosed herein is directed to a position-tracking system, which includes a light source operable to output light of a first polarization and a tracking device comprising a first plurality of reflectors. The first plurality of reflectors each are operable to receive the light of the first polarization and transmit reflected light along a first plurality of reflected paths, the reflected light having a second polarization. The position tracking also includes a sensor operable to receive the reflected light of the second polarization.

The present disclosure includes embodiments of a method of manufacturing a head-tracking device operable to track head positions of a viewer. The disclosed method includes providing a pair of stereoscopic eyewear comprising a frame and a pair of lenses disposed within a pair of openings defined through the frame, the pair of lenses operable to transmit stereoscopic images to eyes of the viewer. The disclosed method further includes coupling a reflector to the pair of stereoscopic eyewear, the reflector being operable to reflect incident light along different reflected paths as the head of the viewer moves.

BRIEF DESCRIPTION OF THE DRAWINGS

Embodiments are illustrated by way of example in the accompanying figures, in which like reference numbers indicate similar parts, and in which.

DETAILED DESCRIPTION

The above described stereoscopic 3-D systems do not have any knowledge of the position of the viewer. In some cases, this deficiency is undesirable but may be tolerable. In the cinema, for example, it may be reasonable to present the same scene to each viewer, even though they are sitting in different parts of the cinema. Furthermore, the audience members in a cinema do not move significantly while watching. It is less tolerable, however, in the case of smaller displays and situations in which viewers may move by a significant amount relative to the scale of the system. In these situations, the 3-D effect may be diminished by an unrealistic visual effect in which the 3-D image may appear to "follow" the movement of the viewer. Such an unrealistic visual effect is attributable to the fact that conventional 3-D systems are incapable of portraying the effects of parallax as the viewer moves, which is a fundamental limitation of stereoscopic 3-D systems that present only two views, independent of the viewer's position.

Figure 1A:
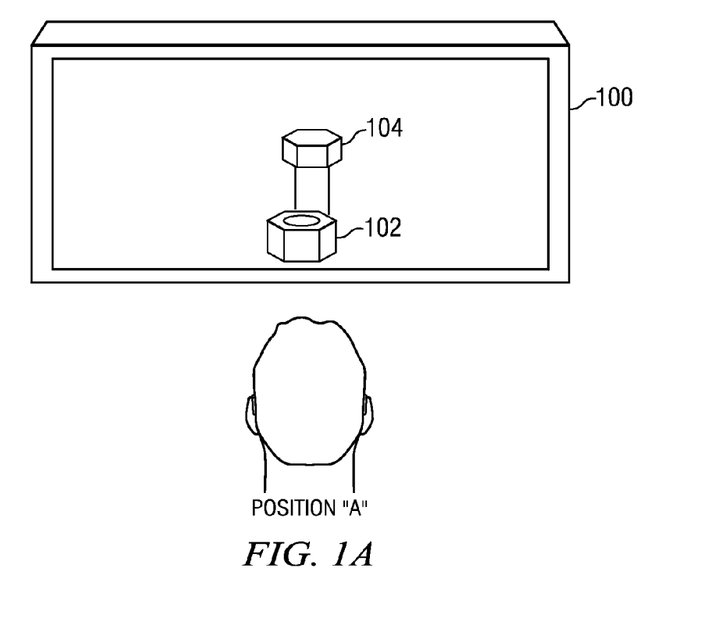
FIG. 1A illustrates a schematic view of a conventional display seen from a first position.

FIG. 1A is an elevational view of a conventional display 100. Illustrated in FIG. 1A is the view of the conventional display 100 showing a nut 102 and a bolt 104 seen from position "A." If the display is operating in stereo, then the viewer would perceive a sensation of depth with the nut 102 appearing closer to them than the bolt 104. For clarity, no attempt has been made here to illustrate the details of the disparities between the left- and right-eye views that are used to create that perception.

Figure 1B:
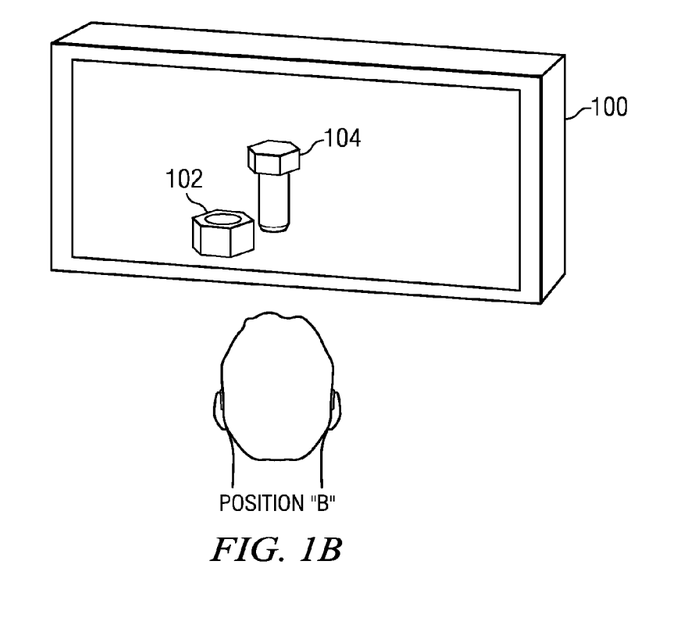
FIG. 1B illustrates a schematic view of the conventional display shown in FIG. 1B seen from a second position.

FIG. 1B is an elevational view of the conventional display 100 seen by the viewer from position "B." The image data that are being presented remain the same; however, because the viewer is perceiving a 3-D effect, he feels as if the objects are rotating to follow him, since the desired effect of motion parallax is not present. To the viewer, this effect would feel strange and unnatural.

Figure 2:
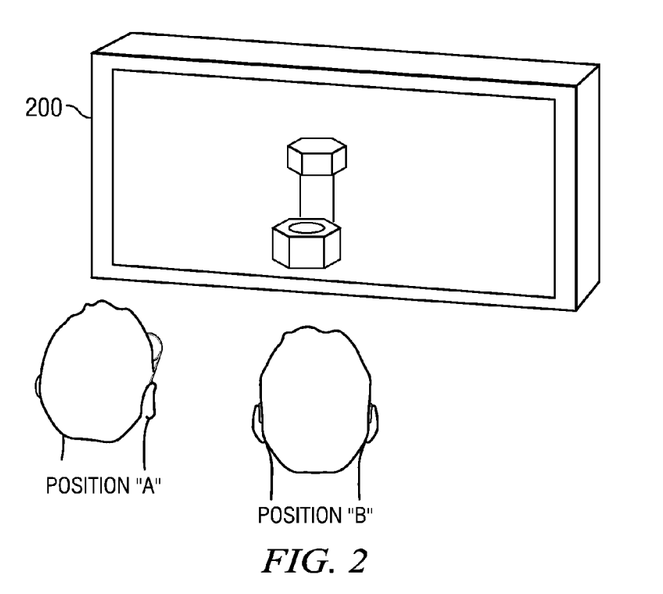
FIG. 2 illustrates a perspective view of an embodiment of a position tracking device, in accordance with the present disclosure.

FIG. 2 is a perspective view of an display system 200. FIG. 2 illustrates what would have been seen from position "B" if the image data were altered to present appropriate views for this new viewing position. In this case the sensation of depth presented by the stereo system is matched by the parallax generated by head motion. As such, the display system 200 is operable to display 3-D images that accommodates for the movements of the viewer.

For the display system 200 to calculate the image data appropriately, knowledge of the position of the viewer may be used. Furthermore, with knowledge of the position of each eye, appropriate left- and right-eye views, can be calculated for stereo display systems. To achieve this goal, the display system 200 may include a suitable head tracking device (not shown). Various types of commercial and experimental head tracking systems exist that use a variety of different techniques. In one embodiment, the head-tracking system of the display system 200 may include an infra-red (IR) sensitive camera to capture the positions of IR LED "markers" or retro-reflective markers attached to the viewer. Examples of such head-tracking systems include the commercial "TrackIR" system from Naturalpoint Inc. of Corvalis, Wash., and "Freetrack," a public domain software program that uses commercially available "webcams" to acquire an image. Many webcams may easily be modified by removing their IR blocking filter and, optionally, adding a filter to block visible light and pass the IR signal. The Freetrack system uses three LEDs, or markers, arranged in a tilted plane. Images of these markers are acquired by the camera; and from the positions of the markers in the image, a computer system is able to calculate the position (in X, Y, and Z coordinates) and the orientation of the user (within a certain range).

In another embodiment, the display system 200 may include a head-tracking system similar to the one used in the Nintendo "Wii" game console. The Wii console is equipped with a remote controller that contains a special purpose camera. It is a "system-on-a-chip" camera made by Pixart Imaging Inc. of Taiwan, and it is designed to capture images in the infrared spectrum, and from these images, report to the Wii console the positions and brightness of dots, rather than the entire image.

In U.S. Pat. No. 6,163,336, which is hereby incorporated by reference, Richards discloses a system that uses retro-reflections of polarized infra-red light from the human eye to a camera. The system disclosed in Richards does not manipulate the polarization state of the light, other than by acknowledging that scatter causes depolarization which allows some light to pass to the sensor.

In U.S. Pat. No. 5,712,732, which is hereby incorporated by reference, Street discloses a display system that uses head tracking based on a retro-reflective marker attached to the user's head. The system disclosed in Street does not use polarization control of any kind. Similarly, in U.S. Pat. No. 6,791,531, which is also hereby incorporated by reference, Johnston teaches that retro-reflective markers can be attached to various parts of the user's body, but he too does not consider the use of polarization control.

In U.S. Pat. No. 6,304,286, hereby incorporated by reference, Shirai discloses a display system that selects from a discrete set of views to present to the left and right eyes of the viewer as a function of the viewer's position. This system uses a set of photo-detectors, which are screened by the user depending on their position, to estimate position and select views. Accordingly, the benefits of using position information are understood, however, the tracking used is not comparable with the disclosed approach.

Figure 3:
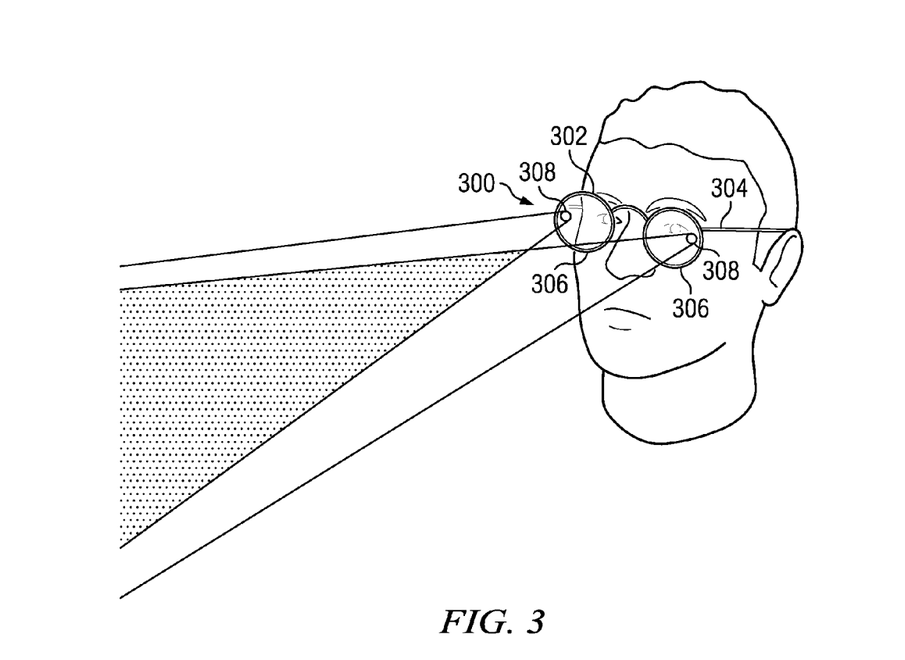
FIG. 3 illustrates an exemplary embodiment of a head-tracking device for stereoscopic imaging.

FIG. 3 is a perspective view of an exemplary embodiment of a head-tracking device 300 according to the present disclosure. The head-tracking device 300 is operable to track the head positions of a viewer while allowing enhanced stereoscopic images to be presented to the viewer. The head-tracking device 300 may include a pair of stereoscopic eyewear 302 that includes a frame 304 and a pair of lenses 306 disposed within a pair of openings defined through the frame 304. The lenses 306 may include any optical element operable to transmit light. In an embodiment, the lenses 306 may be passive lenses. In another embodiment, the lenses 306 may be configured to include optical filters or retarders. When the viewer wears the eyewear 302, the pair of lenses 306 may be operable to receive stereoscopic images from an image source and transmit the stereoscopic images to the eyes of the viewer. The head-tracking device 300 may further include one or more reflector 308 coupled to the pair of stereoscopic eyewear 302. The reflector 308 may be operable to receive and reflect incident light along reflected paths as the head of the viewer moves. For example, a position sensor (not shown) associated with a display system (not shown) may "see" the reflections from the reflector 308 and allow for the tracking of the head positions of the viewer. While the head-tracking device 300 may include only one reflector 308, some embodiments of the head-tracking device 300 may include a plurality of reflectors 308 as illustrated in FIG. 3. Embodiments of head-tracking device 300 that include a plurality of reflectors 308 may more easily distinguish the signals from background noise, and may be able to determine head distance and orientation by measuring the relative positions of the reflectors 308.

In an exemplary embodiment, the reflector 308 may be a passive reflector. An advantage of using a passive reflector is that a battery is not required to power the reflector, and accordingly, passive reflectors are suitable for incorporation into any kind of eyewear, including inexpensive passive glasses. In another exemplary embodiment, the reflector 308 may be a retro-reflector, which may allow the signal from the reflector 308 to be relatively large when compared with reflections from surrounding surfaces. The head-tracking device 300 may incorporate any suitable type of retro-reflectors described herein or known in the art, in accordance with the principles of the present disclosure. An example of a suitable retro-reflector referenced above is a corner cube reflector. A corner cube reflector is constructed with three mutually perpendicular surfaces. A light ray that reflects from inside this "corner" emerges parallel to the incident ray. This type of reflector may be molded into the frame 304 of the eyewear 302. A second example of a suitable retro-reflector referenced above is the "Reflexite" tape, made by Reflexite Corporation. This is a version of the corner cube reflector, but the "corners" are microscopic prisms supplied on a flexible substrate. A third example of a suitable retro-reflector referenced above is a positive lens, with a spherical concave surface positioned a focal length behind it. This is how the so-called "cat's eyes" retro-reflective road markings work. A fourth example of a suitable retro-reflector referenced above is the "Scotchlite" film, which is a variant of the lens-and-reflector idea that combines both functions into millions of microspheres embedded in an adhesive tape.

It is to be appreciated that the embodiments of the head-tracking device 300 described here are merely exemplary and may be modified according to the principles of the present disclosure. It is to be further appreciated that the head-tracking device 300 may be partly or wholly incorporated into or used in combination with any head-tracking systems described in the present disclosure or any other suitable systems.

Figure 4:
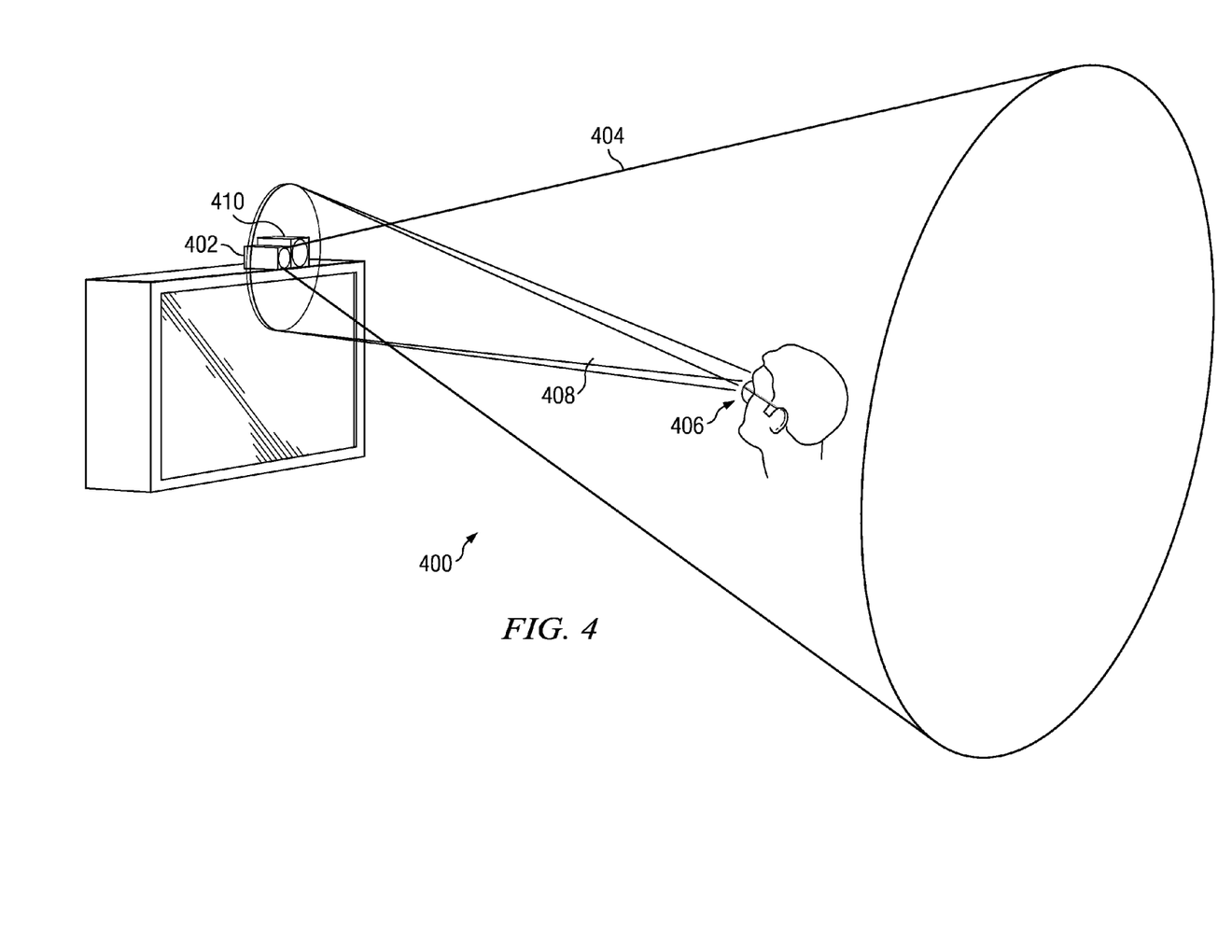
FIG. 4 illustrates an exemplary embodiment of a head-tracking system for stereoscopic imaging.

FIG. 4 is a schematic diagram of an embodiment of a head-tracking system 400. The head-tracking system 400 may include a light source 402 operable to output light 404 toward a viewer. The light source 402 may include a filter (not shown) to filter out specific spectrum of light, thereby allowing the light source 402 to provide light 404 that comprises only the desired spectrum. In the illustrated embodiment, for example, the light source 402 may be configured to output infrared light 404, and accordingly, the space surrounding the viewer is illuminated with infrared light 404. The head-tracking system 400 may further include a tracking device 406. The tracking device 406 may be the head-tracking device 300 shown in FIG. 3, which includes a first plurality of reflectors operable to receive the light 404 of and transmit reflected light 408 along a first plurality of reflected paths. The first plurality of reflectors may be retro-reflectors, and the reflected lights 408 may accordingly be retro-reflected light. The head-tracking system 400 may further include a camera module 410, which may include a sensor (not shown) operable to receive the reflected light 408. In an embodiment, the camera module 410 may also include a controller (not shown) in communication with the sensor and configured to track the positions of the first plurality of reflectors according to the first plurality of reflected paths. In another embodiment, the light source 402 may be incorporated into the camera module 410 or disposed proximate to the camera module 410.

Figure 5A:
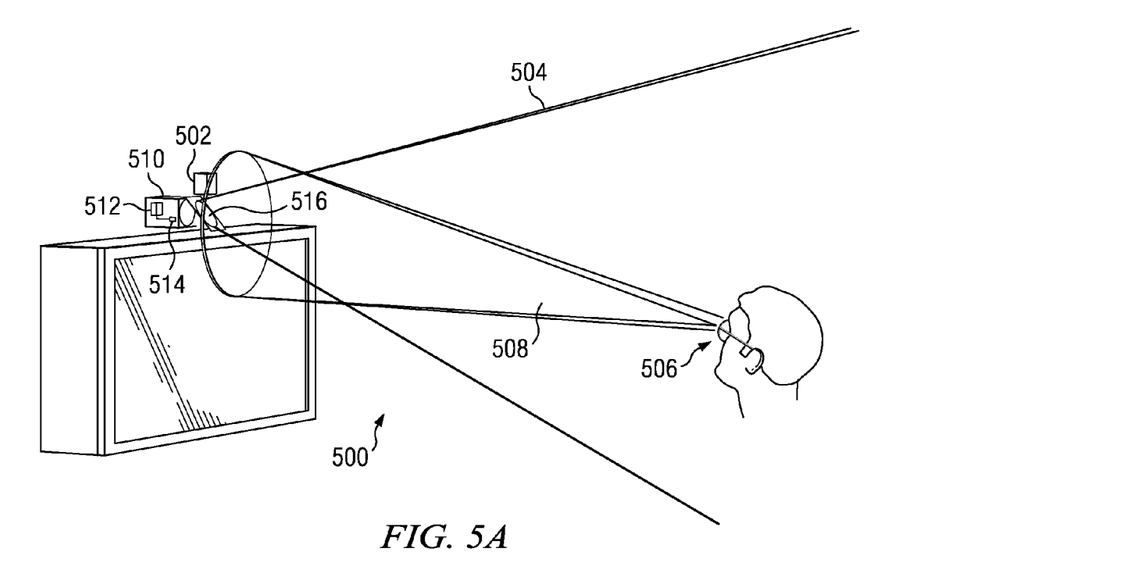
FIG. 5A illustrates another exemplary embodiment of a head-tracking system for stereoscopic imaging.
Figure 5B:
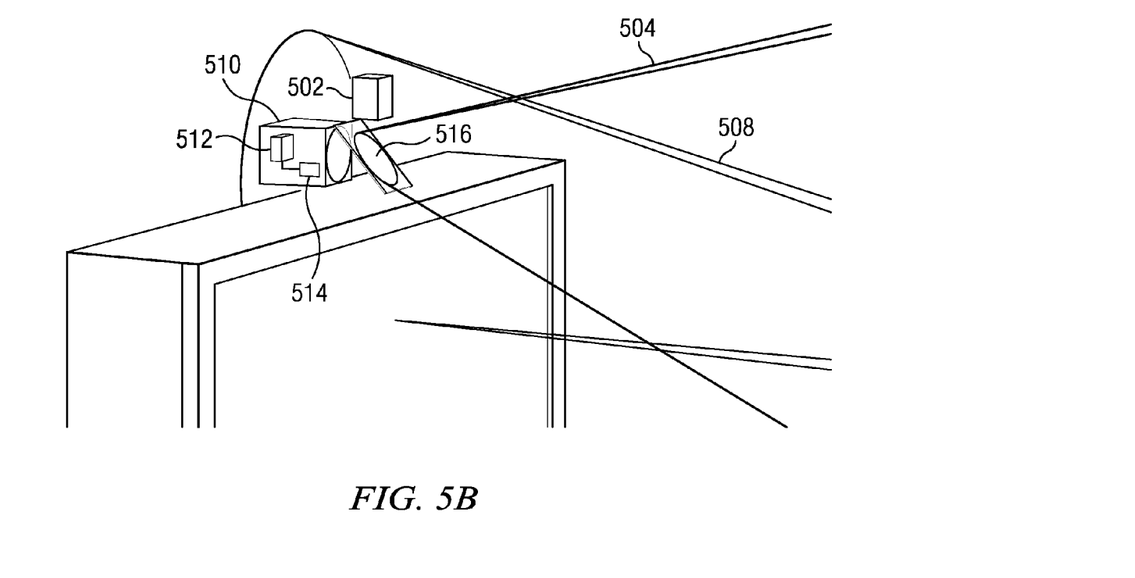
FIG. 5B is a partial, focused view of the head-tracking system shown in FIG. 5A.

FIG. 5A is a schematic diagram of an embodiment of a head-tracking system 500, and FIG. 5B is a partial, focused view of the head-tracking system 500. Similar to the head-tracking system 400, the head-tracking system 500 may include a light source 502 operable to output light 504 toward a viewer. The light source 502 may include a filter (not shown) to filter out specific spectrum of light, thereby allowing the light source 502 to provide light 504 that comprises only the desired spectrum. The head-tracking system 500 may further include a tracking device 506. The tracking device 506 may be the head-tracking devices 300 or 400 shown in FIG. 3 or 4, respectively. The tracking device 506 may include a first plurality of reflectors operable to receive the light 504 of and transmit reflected light 508 along a first plurality of reflected paths. In some embodiments, the tracking device 506 includes a retro-reflector (not shown) operable to provide the reflected light 508. The head-tracking system 500 may further include a camera module 510, which may include a sensor 512 operable to receive the reflected light 508. In an embodiment, the camera module 510 may also include a controller 514 communicatively coupled with the sensor 512, and the controller 514 may be configured to track the positions of the first plurality of reflectors according to the first plurality of reflected paths. In the illustrated embodiment, the light source 502 and the camera module 510 are oriented such that they are optically coaxial, and a beam splitter 516 is positioned in the light path of the light 504 from the light source 502 to direct the light 504 towards the viewer and the tracking device 506. Such an orientation of the light source 502 and the camera module 510 allows for efficient detection of the reflected light 508, particularly in embodiments in which the tracking device 506 includes at least one retro-reflector. When a retro-reflector is used, reflection is predominantly back along the direction of incidence, and orienting the camera module 510 to be optically coaxial with the light source 512 allows the camera module 510 to line up with the direction of incidence light 504 and be in an efficient position for detecting retro-reflected light 508.]

Figure 6A:
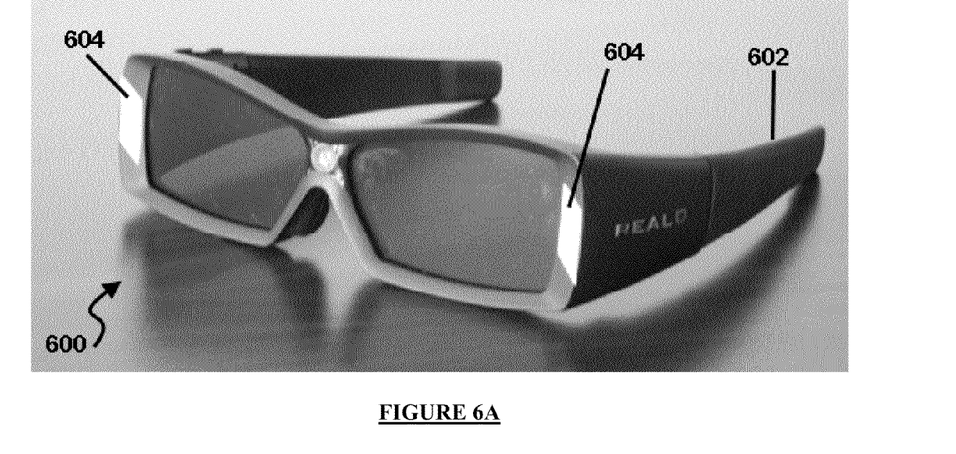
FIG. 6A is an image of an exemplary embodiment of a head-tracking system comprising retro-reflectors.
Figure 6B:
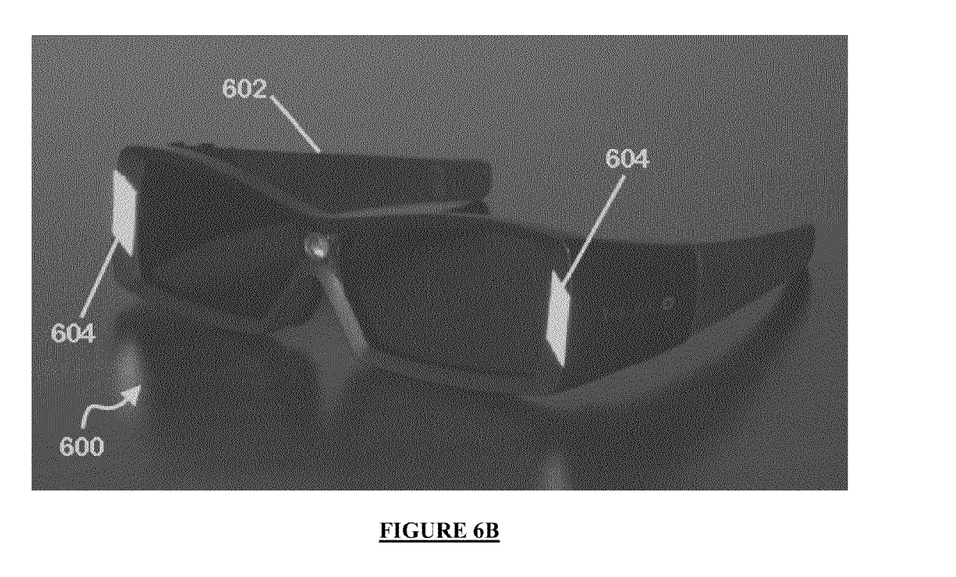
FIG. 6B is another image of the head-tracking system shown in FIG. 6A.

In image-display applications, the use of retro-reflection enhances signal-to-noise ratio by directing IR light from a source near the back of a display, to the reflector at the user, and back to a sensor near the source. FIG. 6A is an image of a head-tracking device 600 in ambient light. The head-tracking device 600 includes a pair of RealD "Crystaleyes 5" shutterglasses 602 and retro-reflector 604 made of Reflexite. FIG. 6B is an image of the head-tracking device 600 illuminated by a light source (not shown), such as the light source 402 or 502 of the head-tracking systems 400 or 500. The images in FIGS. 6A and 6B are generated based on the data collected at a sensor (not shown) proximate to the light source. The effect of the retro-reflective nature of the retro-reflector 604 is clearly seen in FIG. 6B, in which the retro-reflectors 604 appear to be disproportionally bright because they direct the light from the light source back towards the light source (which is proximate to the sensor).

Despite the use of retro-reflector, there is still, however, the possibility of bright, specular reflections emanating from smooth surfaces such as the lenses of the eyewear, smooth plastic, or metal surfaces on the frames of the eyewear, jewelry, or other objects. Such bright "glints" could confuse a tracking system that is expecting to see only bright reflections from tracking dots. Techniques such as pulsing the light source can be used to distinguish between the return signal and external sources of light, but that may not be effective if the spurious signals are coming from reflected light from the light source.

One approach for suppressing such unwanted reflections is to use polarized light to illuminate the user. Since specular reflections are largely polarization-preserving, the unwanted "glints" can be blocked from the sensor by an analyzing polarizer. If linear polarization is used to illuminate the user, the sensor's polarizer may be crossed with the illumination polarization direction. In this embodiment, the retro-reflected light may have its polarization direction rotated through 90 degrees so that it is transmitted by the analyzing polarizer and is then visible to the detecting camera.

Figure 7A:
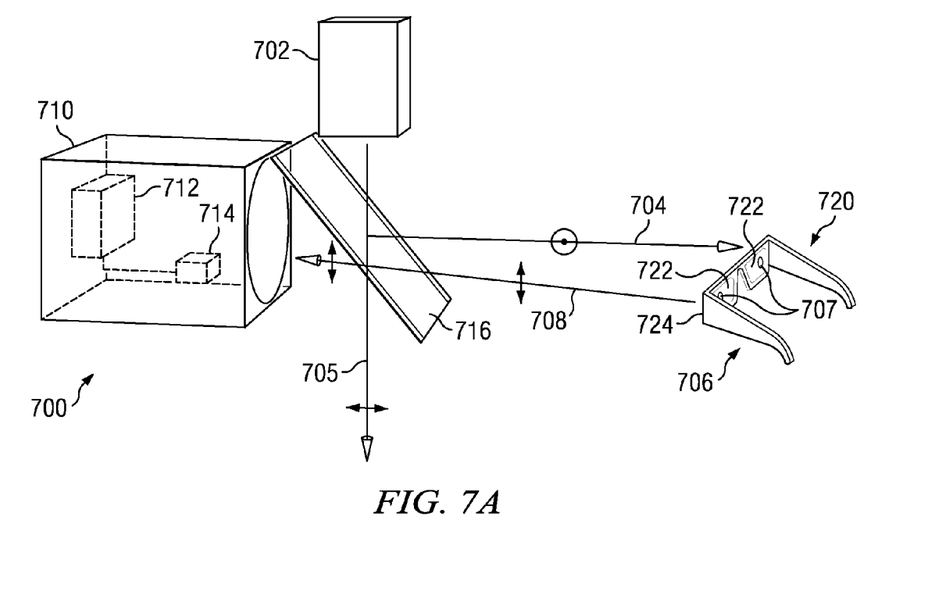
FIG. 7A illustrates an exemplary embodiment of a position-tracking system.

FIG. 7A is a schematic view of an exemplary embodiment of a position-tracking system 700. The position-tracking system 700 may include tracking device 706 and a light source 702 operable to output light 704 towards the tracking device 706. The light 704 has a first polarization, and in the illustrated embodiment, it may be in the infrared spectrum. The tracking device 706 may include one or more reflectors 707, which are operable to receive the light 704 from the light source 702 and transmit reflected light 708 along different reflected paths as the head of the viewer moves. The reflected light 708 has a second polarization that is different from the first polarization. The position-tracking system 700 may further include a camera 710 that includes a sensor 712 operable to receive the reflected light 708. In an embodiment, the camera 710 may also include a controller 714 in communication with the sensor 712 and configured to track the positions of the reflectors 707 according to the reflected paths of the reflected light 708. In the illustrated embodiment, the light source 702 and the camera 710 are oriented such that they are optically coaxial, and a beam splitter 716 is positioned in the light path of the light 704 from the light source 702 to direct the light 704 towards the viewer and the tracking device 706.

It is to be appreciated that a variety of configurations of the position-tracking system 700 may be used to output light 704 having a first polarization. In the illustrated embodiment, which a coaxial illumination system, the beam splitter 716 may be a polarizing beam splitter 716 that operates in the infrared spectrum. An example of such a device is the "Proflux" wire-grid polarizer made by Moxtek (Orem, Utah). As such, s-polarized light 704 is directed to the tracking device 706 while p-polarized light 705 is lost as it gets transmitted downwardly. A person of ordinary skill in the art will appreciate that the polarizing beam splitter (PBS) 716 may be rotated or configured so that s-polarized light will pass through the PBS, while p-polarized light will be reflected off of the PBS. It should be noted that other types of PBSs known in the art may alternatively be used. In some embodiments, the downwardly directed transmitted beam can be suppressed by the inclusion of a pre-polarizer (not shown) at the light source 702. This is beneficial because some of the beam may be backscattered and could be depolarized and reflected back to the camera 710.

In an embodiment, the tracking device 706 may include a pair of stereoscopic eyewear 720, which includes a frame 724 and a pair of lenses 722 disposed within a pair of openings defined through the frame 724. The pair of lenses 722 are operable to receive and transmit stereoscopic images to the eyes of the viewer. The reflectors 707 may be coupled to the pair of stereoscopic eyewear 720.

Figure 7B:
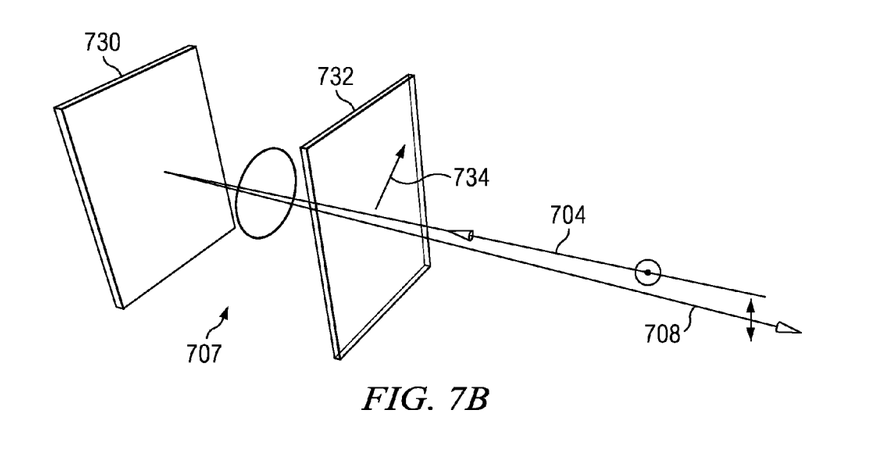
FIG. 7B is an exploded view of the tracking device shown in FIG. 7A.

FIG. 7B is a schematic exploded view of an exemplary embodiment of the reflectors 707 that may be used to achieve the polarization rotation of the incident light 704 as it becomes the reflected light 708. In an embodiment, a reflector 707 receives s-polarized incident light 704 and rotates the polarization to p-polarized light 708. A person of ordinary skill in the art will appreciate that in an alternative embodiment, the reflector 707 may be configured to receive p-polarized light and reflect s-polarized light. The reflector 707 includes a reflective substrate 730 and a retarder 732, which may be oriented in front of the reflective substrate 730 along the optic path of the incident light 704. The retarder film 732 may be connected to the reflective substrate 730 using a variety of techniques known in the art, such as lamination or mechanical coupling. The reflective substrate 730 may include any suitable reflectors described in the present disclosure, and in the illustrated embodiment, the reflective substrate 730 includes a retro-reflector. The retarder 732 may be any retarder suitable to alter the polarization state of the incident light 704, and in the illustrated embodiment, it includes a quarter-wave plate.

In an embodiment, the incident light 704 may be provided by solid state sources and have a wavelength of approximately 950 nm. For example, suitable solid state sources include the Osram SFH4600 Light Emitting Diode. If a wavelength of 950 nm is used, then a retarder 732 with a retardance of approximately 237 nm (at 950 nm) may efficiently perform the desired polarization rotation. In a preferred embodiment, the slow axis 734 of the retarder 732 may be oriented at 45 degrees to the polarization direction of the incident light 704, as illustrated in FIG. 7B.

It is to be appreciated that the polarization rotation efficiency diminishes as the user tilts his head to the side, reaching zero at 45 degrees. If the implementation of the position-tracking system 700 is expected to involve large head tilts, the retro-reflectors 707 may be enhanced by arranging the retarder 734 to have two regions, one with its slow axis at substantially 45 degrees to the incident light polarization direction with the glasses in the standard position, and one region with the slow axis substantially parallel or perpendicular to the incident light polarization direction. As the eyewear 720 are tilted, this second region becomes brighter and augments the dimming primary region.

In addition to quarter wave plate, the retarder 732 may be another suitable type of retarder, depending on the design of the position-tracking system 700. Other suitable retarders include, for example, half-wave plates, retarder stacks (compound retarders), and retarder stack filters operable to selectively alter the polarization state of a first spectrum of the incident light 704. In embodiments in which compound retarders are used, the compound retarders may be configured to optimize field of view, contrast, or other desirable optical display properties.

Another technique of minimizing specular reflections from the lens of polarized eyewear is to arrange for the incident polarization direction to be crossed with the front polarizer of the lenses 722. In one embodiment, if this direction is at an angle such as 45 degrees to the horizontal, then the entire polarization control part of the position-tracking system 700 may be rotated. In another embodiment, a half-wave plate at 22.5 degrees may be used to rotate the polarization direction. If linearly polarized passive lenses 722 are used, it may be acceptable to arrange the incident light 704 to be crossed with one lens 722 and parallel to the other lens 722. By choosing these angles, the reflection from the back surface of the parallel illuminated lens 722 may not be rotated and so may be blocked at the sensor 712.

It is to be appreciated that the position-tracking devices and systems of the present disclosure may be implemented in a variety of systems, including stereoscopic display systems. Other potential implementations include game rendering. Game developers are accustomed to rendering the "world" of the game from a particular point of view. This viewpoint is controlled in a variety of ways, depending on the type of game that is played. Sometimes the viewpoint simply follows the player, sometimes the player has a lot of control over the viewpoint, and sometimes the game designer makes decisions over where the viewpoint is located for certain parts of the game. In any case, the game programmer passes the coordinates of the viewpoint, along with other necessary information, to the graphics system. For example, using Microsoft Direct3D technology the programmer may use the methods Matrix.LookAtLH and Matrix.PerspectiveOffCenterLH to construct the view and projection matrices respectively. These methods accept the location of the viewpoint in 3-dimensional space and together are used to determine how the 3D world is rendered to the screen. If head tracking is available to the game designer, then the x, y, and z position of the player with respect to the screen that forms the window into the world of the game may be taken into account. In particular, the Matrix.PerspectiveOffCenterLH method is helpful for creating an off-center frustum that maintains the correct viewing geometry as the player moves around with respect to the screen. An example of how these methods can be used to render changing perspectives as a function of head position is the "WiiDesktopVR" program available online from J.C. Lee (http://www.cs.emu.edu/~johnny/projects/wii/WiiDesktopVR.zip) and is herein incorporated by reference. This program uses the Managed Library for the Nintendo Wiimote made available by Brian Peek (www.wiimotelib.net) to obtain dot position information from a "Wiimote"

viewing IR LEDs attached to glasses. The Microsoft DirectX 9.0 SDK contains an example program which Lee modified to use the methods referenced above to present a demonstration of motion parallax.

For a game to take advantage of stereo, two views should be rendered and displayed correctly. One exemplary embodiment for doing this includes using the Microsoft Direct3D Viewport method to make separate viewports for which the left and right views are to be rendered. If these viewports are arranged to be side-by-side on the screen the resulting output is compatible with the RealD side-by-side format disclosed in U.S. Pat. No. 5,193,000, which is hereby incorporated by reference. The output can then be sent to a suitably equipped display.

Below is an exemplary skeleton of the pertinent code:

```
Microsoft.DirectX.Direct3D.Viewport leftViewPort = new Viewport( );
leftViewPort.X = 0;
leftViewPort.Y = 0;
leftViewPort.Width = display_Width / 2;
leftViewPort.Height = display_Height;
Microsoft.DirectX.Direct3D.Viewport rightViewPort = new Viewport( );
rightViewPort.X = (display_Width / 2);
rightViewPort.Y = 0;
rightViewPort.Width = display_Width / 2;
rightViewPort.Height = display_Height;
device.BeginScene( );
device.Viewport = leftViewPort;
// Render the left-eye image here
   device.Viewport = rightViewPort;
// Render the right-eye image here
   device.EndScene( );
```

One aspect of the software relating to head tracking is to address the problems caused by the finite resolution of the IR camera. In some embodiments, the particular camera used to capture images of the tracking device may be the Wii remote camera, which has a horizontal resolution of 1024 pixels. It is set up with a field of view of about 45 degrees. There is a trade-off between increasing the field of view to achieve a larger tracking volume and the corresponding reduction in angular resolution. The distance from the camera to the viewer may be calculated in the following way:

$$D=d/(2*\tan(a/2)) \text{ where:}$$

D is the distance from the camera to the eyewear, d is the separation of the reflective dots on the eyewear, and a is the angular separation of the dots as determined by the camera. If this formula is rearranged and solved for d=140 mm, D=2m and by noting that the camera images a 45 degree field of view onto 1024 pixels, then it can be shown that the spot separation on the detector is about 90 pixels. This relatively small number of pixels translates into a rather coarse resolution of distance, of a bit more than 2 cm per pixel (almost an inch). What this means is that the quantization of this camera system's spot-recognition output into integer pixels may result in a "jerky" "in-and-out" feeling as one moves smoothly from side to side in the detection area.

An embodiment for improving the problem includes implementing a smoothing algorithm in both the Z direction (distance) and the X & Y (horizontal and vertical) directions. A simple moving average approach, as illustrated below, may be implemented.

$$\text{headDist} = (\text{headDistOld}*(T\text{const}-1)+\text{headDist})/T\text{const};$$

$$\text{headDistOld} = \text{headDist};$$

Different time-constants may be used for Z compared to X & Y because the quantization in distance is much coarser in Z than in X & Y. Clearly there are many similar approaches that could be taken, but even this technique yields improvement.

Also, the distance quantization problem may be addressed by improving the resolution of the camera system, or by performing more sophisticated image processing to yield, effectively, sub pixel estimations of the spot center. It may, however, be appealing to use inexpensive, moderate resolution, camera systems and so "Z-smoothing," in particular, may be a valuable addition.

In the geometry of a two-point distance-estimation system, there is an ambiguity in the determination of whether the viewer has moved further from the camera, or whether the viewer has rotated their head about a vertical axis. In both cases the dots that are detected move closer together on the camera sensor. In an embodiment, this ambiguity may be addressed with a third out-of-plane reflector. In another exemplary embodiment, rotational movement of the head may be distinguished and tracked based on the off-axis properties of the reflectors. Referring back to FIG. 6A, reflectors of the tracking device 600 may be oriented inwardly at an oblique angle relative to each other. The efficiency of the retro-reflector drops as the incident light moves off axis, and so a rotation away from the symmetrical head-on position may rotate one retro-reflector to a more efficient angle and the other to a less efficient angle.

Figure 8A:
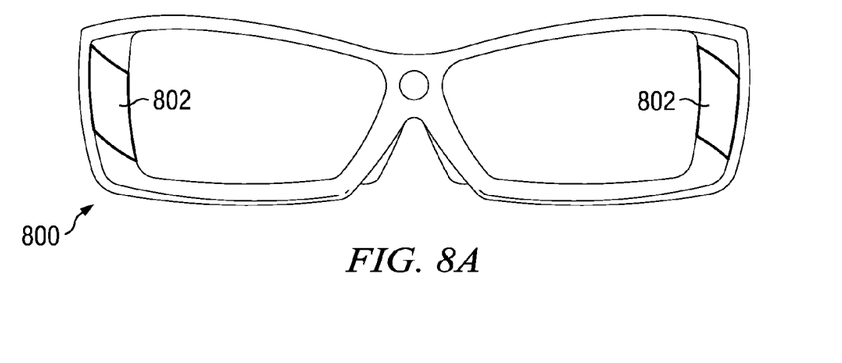
FIG. 8A is a frontal view of an exemplary embodiment of a tracking device.
Figure 8B:
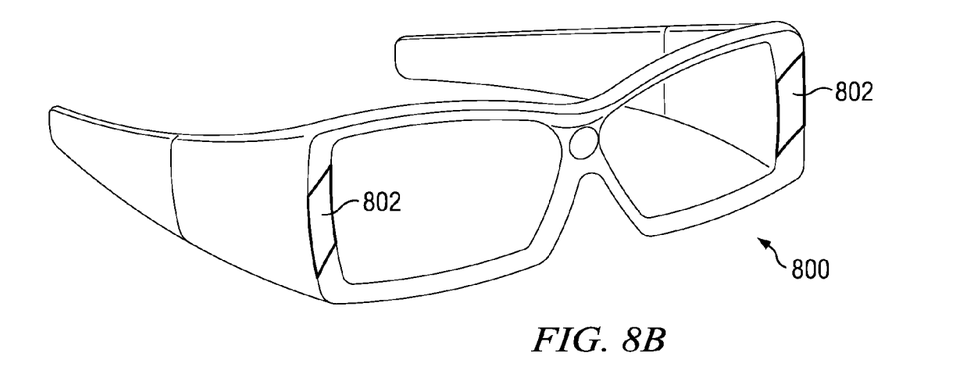
FIG. 8B is an angled view of the tracking device shown in FIG. 8A.

FIG. 8A is a frontal image of a tracking device 800 according to the present disclosure, and FIG. 8B is a view of the tracking device 800 from an angle. The tracking device 800 may be any position-tracking device described in the present disclosure, and may include reflectors 802 oriented inwardly at an oblique angle relative to each other as illustrated. It has been shown that the reflection from the reflector 802 on the right of the images in FIG. 8B is brighter even though it is further from the camera. This may be attributable to the angular effect as well as the contribution of some extra light by the extra projected area. If the tracking device 800 had a different industrial design, the reflectors 802 may be oriented outwardly at an oblique with a similar effect, the difference being that the other reflector 802 would have become brighter in the example shown in FIGS. 8A and 8B.

To account for manufacturing variations or other variables, such as dirt, it may be helpful to include a calibration step in the software. The user may be asked to look directly ahead and the system may capture the relative intensity of the dots. Deviation from this ratio may be interpreted as angle of rotation through use of a pre-programmed function or, optionally, another calibration step for angle. In this additional calibration step, the user may be instructed to move close to the screen and face directly at a sequence of targets on the screen. This gives the system information to construct the appropriate curves. Incorporating the above discussed tracking devices and related method into the position-tracking systems discussed in the present disclosure would thus allow the controller of the position-tracking systems to track rotational movement of the reflectors according to the relative intensity of the reflected light from the reflectors.

One technology that is related to 3-D display, because it uses time-sequential shutter glasses, is the "Dual View" display. Dual view allows two viewers, such as game players, to share the same display but perceive different images due to the time-multiplexed effect of the shutter glasses in conjunction with an appropriately synchronized display.

If the glasses that these viewers are wearing are fitted with retro-reflectors, then the system can deduce where the viewers are located. With this information, the software can render image data appropriate for the viewers' current points of view, and as they move, rapidly update their points of view in response to head-tracking data allowing a rendition of the scene that yields desired motion parallax.

A system like this may be programmed to receive the coordinates of four reflective markers, and deduce which markers correspond to the pair from player "A" and which correspond to those from player "B." The dual-view game may, for example, begin with a simple set-up sequence where each player, in turn, covers his glasses under instructions from the system. Having identified the starting pairs of signals, the software then has the ability to keep track of the motion of the players.

Referring back to FIGS. 7A and 7B, the above discussed dual-view system with head-track may be constructed by modifying the position tracking system 700. Specifically, the position tracking system may include a second tracking device including a second plurality of reflectors, and the second plurality of reflectors may be operable to receive the incident light 704 of the first polarization and output reflected light 708 along a second set of different reflected paths. The controller 714 of the tracking system 700 may be configured to communicate with the sensor 712 to track the positions of the reflectors of the first tracking device and the reflectors of the second tracking device according to the reflected paths of the reflectors of each tracking device.

Alternatively, a more sophisticated, but potentially more robust, approach is to build in A/B identification to the gaming glasses. This may be done geometrically, or with wavelength selectivity. The geometrical approach may involve identifying the reflectors of the first and second devices according to the orientation of the reflectors of the first tracking device relative to each other and the orientation of the reflectors of the second tracking device relative to each other. An exemplary embodiment of the geometrical approach may involve equipping one pair of glasses with two markers on its left side, and the other with two markers on its right side. The system will then "see" three dots per player, and so should be able to determine unambiguously which player is which for the cost of acquiring the coordinates of an extra dot per player. Note that the glasses could be made cosmetically identical by equipping each with the same number of retro-reflective dots, and omitting the retarder on the dots that is intended to be invisible to the camera. Clearly, there are many related geometrical schemes that provide for A/B identification.

A wavelength-based approach may operate by engineering the polarization-rotating retarder on the reflectors to be a more complex multi-layer retarder structure that rotates one wavelength much more efficiently that other nearby wavelengths. An exemplary embodiment of such a multi-layer structure may be a retarder stack filter as discussed above with respect to FIGS. 7A and 7B. Two wavelengths of illuminating LEDs could be used that match the wavelengths of the polarization rotation structures on the "A" and "B" glasses. With both illumination wavelengths operating, the camera would see both sets of dots and either periodically, or whenever player identification is required, the system could interrupt, briefly, one illumination wavelength and cause the dots from one player to disappear, or become much dimmer.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A head-tracking device operable to track head positions of a viewer, comprising:
    a pair of stereoscopic eyewear comprising:
    a frame;
        a pair of lenses coupled to the frame, the pair of lenses operable to receive and transmit stereoscopic images to eyes of the viewer; and
    a plurality of reflectors coupled to the pair of stereoscopic eyewear, the plurality of reflectors each being operable to reflect incident light along different reflected paths as the head of the viewer moves;
    wherein the reflectors each comprise a reflective substrate and a retarder, the retarder operable to transform a polarization state of light after a double pass through the retarder, whereby the incident light has a first polarization state prior to being received at the retarder, and the reflected light has a second polarization state after exiting the retarder, the first and second polarization states being different.

2. The head-tracking device of claim 1, wherein the wavelength of the incident light is in the infrared spectrum, and the plurality of reflectors are operable to reflect light in the infrared spectrum.

3. The head-tracking device of claim 1, wherein the plurality of reflectors each comprise a retro-reflector.

4. The head-tracking device of claim 1, wherein the retarder comprises a half-wave plate.

5. The head-tracking device of claim 1, wherein the retarder comprises a quarter-wave plate.

6. The head-tracking device of claim 1, wherein the retarder comprises a retarder stack.

7. The head-tracking device of claim 6, wherein the retarder comprises a retarder stack filter operable to selectively alter the polarization state of light in a first spectrum.

8. The head-tracking device of claim 1, comprising a first reflector defining a first plane and a second reflector defining a second plane, wherein the first and second reflectors are oriented such that the first and second planes are oriented at an oblique angle relative to each other.

9. A position-tracking system, comprising:
a light source operable to output light of a first polarization;
a tracking device comprising a first plurality of reflectors, the first plurality of reflectors each being operable to receive the light of a first polarization state and transmit reflected light along a first plurality of reflected paths, the reflected light having a second polarization state, wherein the first plurality of reflectors each comprise a reflective substrate and a retarder, the retarder operable to transform a polarization state of light after a double pass through the retarder, whereby the light received by the first plurality of reflectors has the first polarization state prior to being received at the retarder, and the reflected light has the second polarization state after exiting the retarder, the first and second polarization states being different; and
a sensor operable to receive the reflected light of the second polarization.

10. The position-tracking system of claim 9, further comprising a controller in communication with the sensor, the controller being operable to track positions of the first plurality of reflectors according to the first plurality of reflected paths.

11. The position-tracking system of claim 10, wherein the controller is operable to track rotational movement of the first plurality of reflectors according to the relative intensity of the reflected light from each of the first plurality of reflectors.

12. The position-tracking system of claim 9, further comprising a second tracking device, wherein the second tracking device comprises a second plurality of reflectors, the second plurality of reflectors each being operable to receive the light of the first polarization state and output reflected light along a second plurality of reflected paths.

13. The position-tracking system of claim 12, further comprising controller in communication with the sensor, the controller being operable to track positions of the first plurality of reflectors and the second plurality of reflectors according to the first plurality of reflected paths and the second plurality of reflected paths.

14. The position-tracking system of claim 12, wherein the controller is operable to identify the first plurality of reflectors and second plurality of reflectors according to the orientation of the first plurality of reflectors relative to each other and the orientation of the second plurality of reflectors relative to each other.

15. The position-tracking system of claim 12, wherein the first plurality of reflectors are operable to selectively alter the polarization state of light in a first spectrum, and the second plurality of reflectors are operable to selectively alter the polarization state of light in a second spectrum, and further wherein the controller is operable to identify the first plurality of reflectors and second plurality of reflectors according to the wavelength of the reflected light.

16. The position-tracking system of claim 9, wherein the first plurality of reflectors each comprise a retro-reflector.

17. The position-tracking system of claim 9, wherein the retarder is coupled to the reflective substrate, the retarder being oriented in front of the reflective substrate along the optic path of the light of the first polarization state.

18. The position-tracking system of claim 9, further comprising a beam splitter disposed in the optic path of the light of the first polarization state, the beam splitter being operable to direct the light of the first polarization state to the tracking device.

19. The position-tracking system of claim 18, wherein the beam splitter is a polarizing beam splitter.

20. A method of manufacturing a head-tracking device operable to track head positions of a viewer, comprising:
providing a pair of stereoscopic eyewear comprising:
a frame;
a pair of lenses coupled to the frame, the pair of lenses operable to transmit stereoscopic images to eyes of the viewer;
providing a reflective substrate and a retarder;
orienting the retarder in front of the reflective substrate along an optic path of incident light, the retarder being operable to transform a polarization state of light after a double pass through the retarder, whereby the incident light has a first polarization state prior to being received at the retarder, and the reflected light has a second polarization state after exiting the retarder, the first and second polarization states being different;
coupling the reflective substrate and the retarder, thereby forming a reflector; and
coupling the reflector to the pair of stereoscopic eyewear, the reflector being operable to reflect incident light along different reflected paths as the head of the viewer moves.

21. The method of claim 20, wherein the coupling the reflector comprises laminating the reflector to the pair of stereoscopic eyewear.

22. The method of claim 20, further comprising coupling a plurality of reflectors to the pair of stereoscopic eyewear, the plurality of reflectors each being operable to
reflect incident light along different reflected paths as the head of the viewer moves.

23. A position-tracking system operable to communicate with a tracking device to track the position of an object, the tracking device having a first plurality of reflectors, the first plurality of reflectors each being operable to receive the light of a first polarization state and transmit reflected light along a first plurality of reflected paths, the reflected light having a second polarization state, wherein the first plurality of reflectors each comprise a reflective substrate and a retarder, the retarder operable to transform a polarization state of light after a double pass through the retarder, whereby the light received by the first plurality of reflectors has the first polarization state prior to being received at the retarder, and the reflected light has the second polarization state after exiting the retarder, the first and second polarization states being different, the position-tracking system comprising:
a light source operable to output light of the first polarization state;
a sensor operable to receive the reflected light of the second polarization state; and
a controller in communication with the sensor, the controller being operable to track positions of the first plurality of reflectors according to the first plurality of reflected paths;
wherein the controller is operable to process image data to be provided to a display according to the positions of the first plurality of reflectors.

24. The position-tracking system of claim 23, wherein the controller is operable to track rotational movement of the first plurality of reflectors according to the relative intensity of the reflected light from each of the first plurality of reflectors.

25. The position-tracking system of claim 23, wherein the position-tracking system is operable to communicate with a second tracking device to track the position of a second object, the second tracking device having a second plurality of reflectors, the second plurality of reflectors each being operable to receive the light of the first polarization state and output reflected light along a second plurality of reflected paths, and further wherein the controller of the position-tracking system is operable to track positions of the second plurality of reflectors according to the second plurality of reflected paths and process image data to be provided to the display according to the positions of the second plurality of reflectors.

26. The position-tracking system of claim 25, wherein the controller is operable to identify the first plurality of reflectors and second plurality of reflectors according to the orientation of the first plurality of reflectors relative to each other and the orientation of the second plurality of reflectors relative to each other.

27. The position-tracking system of claim 25, wherein the first plurality of reflectors are operable to selectively alter the polarization state of light in a first spectrum, and the second plurality of reflectors are operable to selectively alter the polarization state of light in a second spectrum, and further wherein the controller is operable to identify the first plurality of reflectors and second plurality of reflectors according to the wavelength of the reflected light.

28. The position-tracking system of claim 23, further comprising a beam splitter disposed in the optic path of the light of first polarization, the beam splitter being operable to direct the light of the first polarization state to the tracking device.

29. The position-tracking system of claim 28, wherein the beam splitter is a polarizing beam splitter.

30. A head-tracking device operable to track head positions of a viewer, comprising:

a pair of stereoscopic eyewear comprising:
        a frame;
        a pair of lenses coupled to the frame, the pair of lenses operable to receive and transmit stereoscopic images to eyes of the viewer; and
    a reflector disposed on an outer surface of the pair of stereoscopic eyewear, the reflector being operable to reflect incident light along different reflected paths as the head of the viewer moves, wherein the reflector comprises a reflective substrate and a retarder, the retarder operable to transform a polarization state of light after a double pass through the retarder, whereby the incident light has a first polarization state prior to being received at the retarder, and the reflected light has a second polarization state after exiting the retarder, the first and second polarization states being different.

31. The head-tracking device of claim 30, wherein the wavelength of the incident light is in the infrared spectrum, and the reflector is operable to reflect light in the infrared spectrum.

32. The head-tracking device of claim 30, wherein the reflector comprises a retro-reflector.

33. The head-tracking device of claim 30, wherein the retarder comprises a half-wave plate.

34. The head-tracking device of claim 30, wherein the retarder comprises a quarter-wave plate.

35. The head-tracking device of claim 30, wherein the retarder comprises a retarder stack.

36. The head-tracking device of claim 35, wherein the retarder comprises a retarder stack filter operable to selectively alter the polarization state of light in a first spectrum.

* * * * *